Dec. 20, 1960 A. SILVER 2,965,128
PRESSURE REGULATOR
Filed Jan. 6, 1956

ALEXANDER SILVER,
INVENTOR.

BY John H.J. Wallace

2,965,128
PRESSURE REGULATOR

Alexander Silver, Phoenix, Ariz., assignor to The Garrett Corporation, Los Angeles, Calif., a corporation of California Filed Jan. 6, 1956, Ser. No. 557,741

14 Claims. (Cl. 137—492)

The present invention relates generally to a fluid pressure regulator and relates more particularly to a fluid pressure regulator including means by which a fluid flow control element may be positioned in a manner to effect a particular type of fluid pressure change schedule downstream from the element.

Heretofore, it has been common practice to utilize a normally existing pressure differential across a fluid flow control element to position the element and to effect opening, modulation and/or closing operations thereof. However, in most such instances, opening forces required for application to the element have been opposed by a constant force such as, for example, springs or the like. Accordingly, a fully open condition, with respect to the element, was never actually attained in such prior devices, thus limiting the pressure rise in areas downstream therefrom. In many instances, this downstream pressure must be maintained at a maximum level corresponding to the maximum effective flow area for a given envelope size and weight, without sacrifice of closing forces. The device of the present invention provides such a pressure regulator and fluid flow control arrangement.

It is accordingly one important object of the present invention to provide a pressure regulator mechanism having means for effecting a fully open condition with respect to a fluid flow control element at inlet pressure conditions below the pressure regulator setting, as many occur with, for example, a variable fluid supply pressure.

Another important object of the present invention is to provide a pressure regulating mechanism employing a valve control device having fluid operated means for closing a valve by creating a high pressure differential across the fluid pressure operating means in the closing direction during at least a portion of the time required to close so as to create a high closing torque to lock a toggle knee or other lever arrangement in a closed condition.

A further important object of the present invention is to provide a novel means for controlling the position of a fluid control butterfly valve member.

Figure 1:
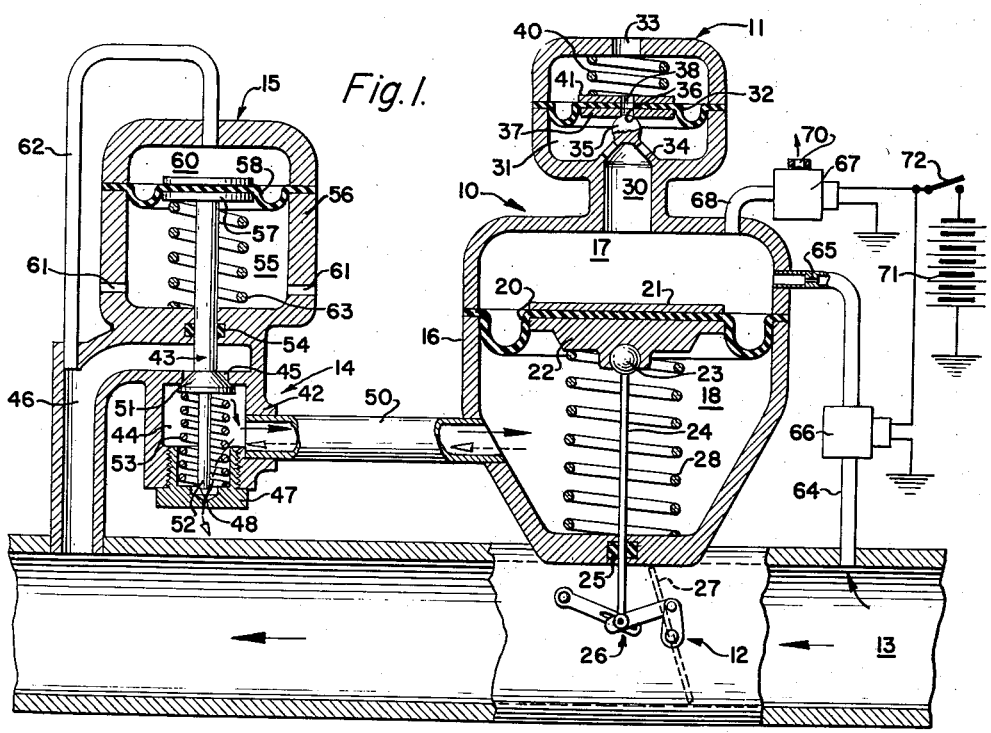
Figure 2:
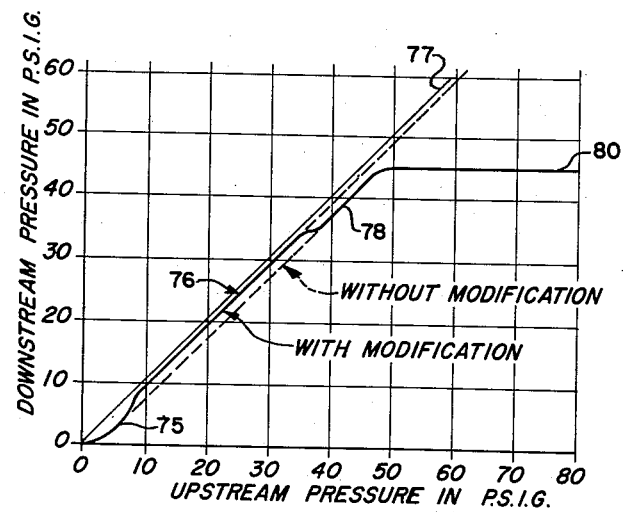

Other and further important objects of the present invention will become apparent from the disclosures in the following detailed specification, appended claims, and accompanying drawing, wherein:

Fig. 1 is a partially schematic view of the pressure regulator and valve control device of the present invention; and Fig. 2 is a graph illustrating a typical pressure rise schedule that may be followed through use of the present valve control device.

With reference to the drawing, the valve control device of the present invention is shown in Fig. 1 as comprising generally an actuator portion 10 coupled with a high limit pressure regulator 11. A fluid flow control element, indicated generally at 12, is adapted to control fluid flow through a conduit 13. The pressures applicable for use in the closing operation of the actuator 10 are controlled by a fluid pressure valving mechanism 14 that is responsive to the action of a secondary actuator 15.

The actuator 10 comprises a housing 16 that is divided into two chambers, and actuation chamber 17 and a backup chamber 18. Chambers 17 and 18 are separated by means of a movable wall that is in the form of a flexible diaphragm 20 which has a peripheral portion supported by the housing 16. The central area of the diaphragm 20 is provided with stiffening plates 21 and 22 which are secured thereto. The plate 22 is adapted to pivotally carry a universal mounting ball 23 from which an operating push rod 24 depends. The rod 24 extends through a gland 25, in the wall of the conduit 13, and is connected, by means of a toggle link arrangement 26, with a butterfly valve member 27 forming a portion of the fluid flow control element 12. A relatively light compression spring 28 is disposed in the backup chamber 18 between one wall of the housing 16 and the diaphragm 20, to bias the diaphragm toward the chamber 17 and to bias the butterfly valve member 27 toward a closed position in the conduit 13.

The chamber 17 in the actuator 10 communicates, by way of a passage 30, with a chamber 31 in the high limit pressure regulator 11. One side of the chamber 31 is formed by a movable wall or diaphragm 32, the other side of the diaphragm being exposed to atmospheric pressure through an opening 33. A web 34 disposed within the chamber 31 stationarily supports a ball valve member 35 which cooperates with a valve seat 36 formed on a backing plate 37 for the diaphragm 32. The valve seat 36 is formed at one end of a passageway 38 extending through the diaphragm 32, the diaphragm 32 being biased normally into contact with the ball valve member 35 by a compression spring 40 disposed between a second backing plate 41 and one end of the housing for the regulator 11. In the event pressure in the chamber 17 and chamber 31 communicating therewith, should reach a predetermined high limit, such pressure will move the diaphragm 32 against the compression of the spring 40 and permit excess pressure in chambers 31 and 17 to escape to the atmosphere through the passageway 38 in the diaphragm 32 and passageway 33 in the housing.

The pressure valving mechanism 14 comprises a housing 42 in which a rod element, indicated generally at 43, is slidably positioned. An intermediate chamber 44 is formed in the housing 42, one end of this chamber being provided with an enlarged opening 45 which communicates by way of a passage 46 with the conduit 13 at a position downstream from the butterfly valve member 27. Another end of the chamber 44 is closed by a fitting 47 having an end wall through which a reduced orifice 48 is formed. The orifice 48 provides limited communication between the chamber 44 and atmosphere. The chamber 44 is further in communication with the chamber 18 of the actuator 10 through a lateral conduit 50.

The rod element 43 carries both a conical poppet valve member 51, which is adapted for cooperation with the port 45, and a pin 52 that is adapted for cooperation with the orifice 48. The valve member 51, on the rod element 43, is biased toward a position to close the port 45 by a compression spring 53 disposed in the chamber 44 intermediate the valve member 51 and the end wall of the fitting 47. Thus, the chamber 18 of the actuator 10 is normally exposed to atmospheric pressure by way of the conduit 50, passageway 44 and orifice 48.

The element 43 extends through a gland 54 and into a chamber 55 formed in a housing 56 of the secondary actuator 15. The end of the element 43, remote from the pin 52 is in contact with a backing plate 57 that is in turn attached to a movable wall or flexible diaphragm 58 that forms one side of a chamber 60 in the secondary actuator 15. The chamber 55 is vented to atmosphere through ports 61 while the chamber 60 receives pressure from the conduit 13 downstream from the valve member 27, through a conduit 62, one end of which communicates with the passage 46. A relatively heavy compression spring 63 is disposed in the chamber 55 between the diaphragm 58 and one wall of the housing 56 to bias the diaphragm 58 toward the chamber 60.

In order to provide means for effecting the operation of the present device, a conduit 64 is positioned to conduct fluid pressure from the upstream side of the valve member 27 to the actuation chamber 17 of the actuator 10, there being an orifice 65 positioned in the conduit 64. A normally closed electromagnetically-operated valve 66 is also positioned in the conduit 64. A normally open electromagnetically-operated valve 67 is disposed in a conduit 68 which also communicates with the chamber 17. The valve 67 has a port 70 leading to atmosphere. A source of electrical energy, such as a battery 71, provides means for energizing the valves 66 and 67 when a suitable switch 72 is closed. When the valves are energized, communication between the chamber 17 and the atmosphere through conduit 68 will be interrupted and fluid pressure from conduit 13 will be admitted to the chamber 17 through conduit 64, rate of flow being limited by the orifice 65. With high upstream pressure being manifest in the chamber 17 and low atmospheric pressure being manifest in the chamber 18, as hereinbefore described, the diaphragm 20 will be moved toward the chamber 18, thus to fully open the butterfly valve member 27 and permit fluid flow into the area of the conduit 13 downstream from the valve member 27. With reference to the graph, Fig. 2, this initial opening action of the valve 27 causes the downstream pressure to rapidly increase as illustrated by a curved portion 75 of the heavy solid line 76. The solid line 77 illustrates the full-open condition of the valve member 27 with the difference between the lines 76 and 77 being by reason of the inherent pressure drop across mechanical elements of the butterfly valve member 27.

While the device of the present invention may be operated on any predetermined schedule, depending upon the force of springs employed, it is to be understood that the effective force of the spring 63, in the secondary actuator 15, must be somewhat higher than the force of the spring 28 in the actuator 10. Thus, when the pressure in the conduit 13 downstream from the valve member 27, reaches a predetermined limit, as determined by the force of the springs 53 and 63 plus the area of the diaphragm 58, the element 43 will be moved by the diaphragm 58 against the compression of springs 53 and 63, to move the pin 52 into position to close the orifice 48 and valve member 51 from its normal position closing the port 45, to a position opening such port. In this condition, fluid pressure in the conduit 13 downstream from the valve member 27 is transmitted to the chamber 18 of the actuator 10 by way of passage 46, port 45, chamber 44 and conduit 50. This change of pressure differential across the actuator diaphragm 20 will result in a slight movement of the valve member 27 toward a closed position to retard the increase in pressure in conduit 13 on the downstream side of valve 27 as indicated by the portion 78 of the line 76 in Fig. 2. With the upstream pressure in the chamber 17 being maintained at a constant level by the pressure regulator 11, when the downstream pressure in the conduit 13 starts to exceed a level equal to the pressure in the chamber 17 minus the force of the spring 28, the diaphragm 20 will move toward the chamber 17 causing valve member 27 to move toward a closed position and modulate the fluid flow into the downstream portion of the conduit 13 to thereby maintain the fluid pressure level therein at a constant value, as illustrated by the horizontal portion 80 of the line 76 in Fig. 2.

Upon de-energization of the valves 66 and 67, chamber 17 will be vented to atmosphere by way of the conduit 68 and valve port 70. With downstream pressure being manifest in the chamber 18, the pressure differential existing across the diaphragm 20 will tend to move the diaphragm 20 toward the chamber 17 causing the valve member 27 to move toward a closed position. The pressure in the conduit 13 downstream from the valve member 27 will immediately start to drop, thereby lowering the pressure in the chamber 60 of the secondary pressure regulator 15, permitting movement of the diaphragm 58 and the element 43 to a position wherein the valve member 51 will close the port 45 and the pin 52 will be moved out of engagement with the edge of orifice 48. This action initiates a drop in the pressure in the chamber 18 but permits outflow therefrom only gradually by the way of the orifice 48, thus maintaining for a limited period of time, a closing pressure in excess of spring 28 on the valve member 27. The toggle can then lock valve in closed condition. Due to the reduced orifice 48, the closing pressure will be gradually dissipated and the relatively slow closing action toward the end of the closing period of the valve member 27 gradually reduces the pressure in the conduit 13 downstream from the valve member, thus preventing undue surge in this conduit or in components that may be connected thereto. This feature is inherent in the operation of the device due to the particular construction thereof.

If, for any reason, there should be a failure of the diaphragm 58 and the pressure at the outlet side of valve 27 should increase beyond a predetermined maximum, such pressure in conduit 46 will move poppet valve 51 toward an open position against the force of spring 53. The area of valve 51 exposed to pressure in conduit 46 and the force of spring 53 are so calculated that the pressure required to open valve 51 in this manner will be slightly in excess of the regulated pressure. When valve 51 is opened in this manner, valve 27 will be caused to move toward a closed or fail-safe condition.

Having thus described the invention and the present embodiment thereof, it is desired to emphasize the fact that many modifications may be resorted to in a manner limited only by a just interpretation of the following claims.

I claim:

1. A fluid pressure regulator comprising valve means disposed for movement in a conduit to control fluid flow therethrough; a movable wall member in motion transmitting relationship with said valve means, said wall member having a first side exposed to the pressure on the upstream side of said valve means and a second side exposed to atmospheric pressure; means for maintaining said upstream pressure acting on said first side of said wall member at a predetermined value; means tending to urge said valve means toward a conduit closing position, pressure on the upstream side of said valve means causing said wall member to move said valve means in opposition to said urging means toward an open position; and means responsive to a predetermined increase in pressure at the outlet side of said valve means to change the pressure to which said second side of the wall member is exposed from atmospheric to the pressure existing at the outlet side of said valve means.

2. A fluid pressure regulator comprising valve means disposed for movement in a conduit to control fluid flow therethrough; a movable wall member in motion transmitting relationship with said valve means, said wall member having a first side exposed to the pressure on the upstream side of said valve means and a second side exposed to atmospheric pressure; means for maintaining said upstream pressure acting on said first side of said wall member at a predetermined value; means tending to urge said valve means toward a conduit closing position, pressure on the upstream side of said valve means causing said wall member to move said valve means in opposition to said urging means toward an open position; means for changing the pressure to which the second side of said wall member is exposed from atmospheric to the pressure existing at the outlet side of said valve means, said means having a second valve means; and means responsive to the pressure at the outlet side of said first mentioned valve means for actuating said second valve means.

3. A fluid pressure regulator comprising valve means disposed for movement in a conduit to control fluid flow therethrough; a movable wall member in motion transmitting relationship with said valve means, said wall member having a first side exposed to the pressure on the upstream side of said valve means and a second side exposed to atmospheric pressure; means for maintaining said upstream pressure acting on said first side of said wall member at a predetermined value; means tending to urge said valve means toward a conduit closing position, pressure on the upstream side of said valve means causing said wall member to move said valve means in opposition to said urging means toward an open position; means for changing the pressure to which the second side of said wall member is exposed from atmospheric to the pressure existing at the outlet side of said valve means, said means having a second valve means; and a second movable wall member with one side exposed to the pressure at the outlet side of said first-mentioned valve means and the other side exposed to atmospheric pressure, a predetermined increase in pressure at the outlet side of said first-mentioned valve means causing said second movable wall member to actuate said second valve means.

4. A fluid pressure regulator comprising valve means disposed for movement in a conduit to control fluid flow therethrough; a movable wall member in motion transmitting relationship with said valve means, said wall member having a first side exposed to the pressure on the upstream side of said valve means and a second side exposed to atmospheric pressure; means for maintaining said upstream pressure acting on said first side of said wall member at a predetermined value; means tending to urge said valve means toward a conduit closing position, pressure on the upstream side of said valve means causing said wall member to move said valve means in opposition to said urging means toward an open position; means for changing the pressure to which the second side of said wall member is exposed from atmospheric to the pressure existing at the outlet side of said valve means, said means having a second valve means; means tending to urge said second valve means toward a first position admitting the atmospheric pressure to the second side of said wall member; and a second movable wall member with one side exposed to the pressure at the outlet side of said first mentioned valve means and the other side exposed to atmospheric pressure, a predetermined increase in pressure at the outlet side of said first mentioned valve means causing said second movable wall member to shift said second valve means to a second position to apply the pressure existing at the outlet side of the first mentioned valve means to the second side of the first mentioned wall means.

5. A fluid pressure regulator comprising valve means disposed for movement in a conduit to control fluid flow therethrough; a movable wall member in motion transmitting relationship with said valve means, said wall member having a first side exposed to the pressure on the upstream side of said valve means and a second side exposed to atmospheric pressure; means for maintaining said upstream pressure acting on said first side of said wall member at a predetermined value; means tending to urge said valve means toward a conduit closing position, pressure on the upstream side of said valve means causing said wall member to move said valve means in opposition to said urging means toward an open position; a second valve means disposed to control the pressure to which the second side of said movable wall member is exposed, said second valve means being movable between a first position admitting the atmospheric pressure to the second side of said movable wall member and a second position admitting pressure from the outlet side of the first valve means to the second side of said movable wall; means yieldably urging said second valve means toward the first position; and means responsive to a predetermined pressure at the outlet side of said first valve means to shift said second valve means from the first to the second position.

6. A fluid pressure regulator comprising valve means disposed for movement in a conduit to control fluid flow therethrough; a movable wall member in motion transmitting relationship with said valve means, said wall member having a first side exposed to the pressure on the upstream side of said valve means and a second side exposed to atmospheric pressure; means for maintaining said upstream pressure acting on said first side of said wall member at a predetermined value; means tending to urge said valve means toward a conduit closing position, pressure on the upstream side of said valve means causing said wall member to move said valve means in opposition to said urging means toward an open position; a second valve means disposed to control the pressure to which the second side of said movable wall member is exposed, said second valve means being movable between a first position admitting the atmospheric pressure to the second side of said movable wall member and a second position admitting pressure from the outlet side of the first valve means to the second side of said movable wall member; means yieldably urging said second valve means toward the first position; and a second movable wall in motion transmitting relationship with said second valve means, said second movable wall having a first side exposed to the pressure at the outlet side of said first valve means and a second side exposed to atmospheric pressure, a predetermined increase in pressure at the outlet side of said first valve means causing said second movable wall to shift said second valve means from the first to the second position thereof.

7. A fluid pressure regulator comprising valve means disposed for movement in a conduit to control fluid flow therethrough; a movable wall member in motion transmitting relationship with said valve means, said wall member having a first side exposed to the pressure on the upstream side of said valve means and a second side exposed to atmospheric pressure; means for maintaining said upstream pressure acting on said first side of said wall member at a predetermined value; means tending to urge said valve means toward a conduit closing position, pressure on the upstream side of said valve means causing said wall member to move said valve means in opposition to said urging means toward an open position; a second valve means disposed to control the pressure to which the second side of said movable wall is exposed, said second valve means being movable between a first position admitting the atmospheric pressure to the second side of said movable wall and a second position admitting pressure from the outlet side of the first valve means to the second side of said movable wall; means yieldably urging said second valve means toward the first position; a second movable wall in motion transmitting relationship with said second valve means, said second movable wall having a first side exposed to the pressure at the outlet side of said first valve means and a second side exposed to atmospheric pressure; and means tending to urge said second movable wall in a direction to dispose said second valve means in said first position, a predetermined pressure increase at the outlet side of said first valve means causing said second movable wall to shift said second valve means from said first to said second position.

8. A fluid pressure regulator comprising valve means disposed for movement in a conduit to control fluid flow therethrough; a movable wall member in motion transmitting relationship with said valve means, said wall member having a first side exposed to the pressure on the upstream side of said valve means and a second side exposed to atmospheric pressure; means for maintaining said upstream pressure acting on said first side of said wall member at a predetermined value; means tending to urge said valve means toward a conduit closing position, pressure on the upstream side of said valve means causing said wall member to move said valve means in opposition to said urging means toward an open position; a second valve means disposed to control the pressure to which the second side of said movable wall member is exposed, said second valve means being movable between a first position admitting the atmospheric pressure to the second side of said movable wall member and a second position admitting pressure from the outlet side of the first valve means to the second side of said movable wall member; means yieldably urging said second valve means toward the first position, said second valve means having an area exposed to the pressure at the outlet side of said first-mentioned valve means and being responsive to a predetermined pressure on said area to move to said second position; a second movable wall in motion transmitting relationship with said second valve means, said second movable wall having a first side exposed to the pressure at the outlet side of said first-mentioned valve means and a second side exposed to atmospheric pressure; and means tending to urge said second wall toward a position to dispose said second valve means in said first position, a predetermined increase in pressure at the outlet side of said first-mentioned valve means causing said second movable wall to shift said second valve means to said second position, the pressure required on said area of said second valve means to move said second valve means to said second position being greater than that required on said second movable wall to effect such movement.

9. In a valve member positioning device, a said valve member being positioned in a conduit: a movable wall operably connected to said valve member; means cooperating with said movable wall for biasing said valve member toward a closed position within said conduit; means for exposing one side of said movable wall to high fluid pressure in said conduit upstream from said valve member thereby to urge said valve member in opposition to said biasing means toward an open position; means for maintaining said upstream pressure acting on said one side of said movable wall at a predetermined value; means for normally exposing another side of said movable wall to a region of low pressure; and means responsive to an increase in fluid pressure downstream from said valve member above a predetermined level for terminating said exposure of said movable wall to said region of low pressure and exposing said another side thereof to said downstream fluid pressure.

10. In a valve member positioning device, said valve member being positioned in a conduit: a movable wall operably connected to said valve member; means cooperating with said movable wall for biasing said valve member toward a closed position within said conduit; means for exposing one side of said movable wall to high fluid pressure in said conduit upstream from said valve member thereby to urge said valve member in opposition to said biasing means toward an open position; means for normally exposing another side of said movable wall to a region of low pressure; means responsive to an increase in fluid pressure downstream from said valve member above a predetermined level for terminating said exposure of said movable wall to said region of low pressure and exposing said other side thereof to said downstream fluid pressure; and a poppet valve means for maintaining a predetermined upstream pressure acting upon said one side of said movable wall.

11. In a fluid pressure regulator: a fluid flow conduit; a valve member positioned normally to occlude said conduit; a valve actuator; a diaphragm forming a portion of said actuator and operably connected with said valve member; an actuation chamber formed on one side of said diaphragm; a backup chamber formed on the other side of said diaphragm; conduit means for conducting high pressure fluid upstream from said valve member to said actuation chamber to urge said valve member toward an open position; spring means acting on said diaphragm to oppose the force of said high pressure fluid; an orifice, said backup chamber being vented to atmosphere through said orifice; diaphragm means responsive to an increase in fluid pressure downstream from said valve member and to a predetermined level, for closing said orifice and for simultaneously exposing said backup chamber side of said diaphragm to said downstream pressure thereby to close said valve member upon a predetermined further increase in said downstream fluid pressure; a poppet valve means for maintaining a predetermined upstream pressure in said actuation chamber acting upon said first mentioned diaphragm; and supplemental valve means for simultaneously terminating exposure of said actuation chamber to upstream fluid pressure and exposing said actuation chamber to atmospheric pressure.

12. In a fluid pressure regulator: a fluid flow conduit; a valve member positioned normally to occlude said conduit; a valve actuator; a diaphragm forming a portion of said actuator and operably connected with said valve member; an actuation chamber formed on one side of said diaphragm; a backup chamber formed on the other side of said diaphragm; conduit means for conducting high pressure fluid upstream from said valve member to said actuation chamber to urge said valve member toward an open position; spring means acting on said diaphragm to oppose the force of said high pressure fluid; an orifice, said backup chamber being vented to atmosphere through said orifice; diaphragm means responsive to an increase in fluid pressure downstream from said valve member and to a predetermined level, for closing said orifice and for simultaneously exposing said backup chamber side of said diaphragm to said downstream pressure thereby to close said valve member upon a predetermined further increase in said downstream fluid pressure; a poppet valve means for maintaining a predetermined upstream pressure in said actuation chamber acting upon said first mentioned diaphragm; supplemental valve means for simultaneously terminating exposure of said actuation chamber to upstream fluid pressure and exposing said actuation chamber to atmospheric pressure; and restricting orifice means associated with said supplemental valve means for limiting the rate of pressure change from one condition in said actuation chamber to another condition.

13. A fluid pressure regulator comprising: a valve element disposed for movement in a conduit to control fluid flow therethrough; resilient means tending to urge said valve element toward a conduit closing position; actuating means for said valve element, said actuating means having a body; a movable wall dividing said body into opening and closing pressure chambers, said movable wall being in motion transmitting relationship with said valve element; means establishing limited communication between the opening pressure chamber and the conduit on the upstream side of said valve element; means for maintaining the pressure in said opening pressure chamber at a predetermined value, pressure on the upstream side of said valve element causing said movable wall to shift said valve element in opposition to said resilient means toward an open position; means forming an orifice establishing limited communication between the closing pressure chamber and the ambient atmosphere; means for changing the pressure in said closing pressure chamber from ambient atmospheric to the pressure at the outlet side of said valve element, said means having a second valve element disposed for movement between a first position in which said orifice is open and a second position in which said orifice is closed and communication is established between said closing pressure chamber and the conduit at the outlet side of the first-mentioned valve element, the pressure at the outlet side of the latter valve element tending to move said second valve element toward said second position; resilient means tending to oppose movement of said second valve element toward said second position; and means responsive to the pressure at the outlet side of the first-mentioned valve element to assist the movement of said second valve element toward said second position.

14. A fluid pressure regulator comprising: a valve element disposed for movement in a conduit to control fluid flow therethrough; resilient means tending to urge said valve element toward a conduit closing position; actuating means for said valve element, said actuating means having a body; a movable wall dividing said body into opening and closing pressure chambers, said movable wall being in motion transmitting relationship with said valve element; means establishing limited communication between the opening pressure chamber and the conduit on the upstream side of said valve element; means for maintaining the pressure in said opening pressure chamber at a predetermined value, pressure on the upstream side of said valve element causing said movable wall to shift said valve element in opposition to said resilient means toward an open position; means forming an orifice establishing limited communication between the closing pressure chamber and the ambient atmosphere; means for changing the pressure in said closing pressure chamber from ambient atmospheric to the pressure at the outlet side of said valve element, said means having a second valve element disposed for movement between a first position in which said orifice is open and a second position in which said orifice is closed and communication is established between said closing pressure chamber and the conduit at the outlet side of the first-mentioned valve element, the pressure at the outlet side of the latter valve element tending to move said second valve element toward said second position; resilient means tending to oppose movement of said second valve element toward said second position; a second wall member disposed to move said second valve element toward said second position; resilient means opposing movement of said second wall member in a second valve actuating direction; and means for applying fluid at the pressure existing at the outlet side of the first-mentioned valve element to said second wall means to move the same in opposition to said resilient means.

References Cited in the file of this patent

UNITED STATES PATENTS

| | | |
|---|---|---|
| 1,304,162 | De Schamps | May 20, 1919 |
| 2,047,101 | Grove | July 7, 1936 |
| 2,185,671 | Kimball | Jan. 2, 1940 |
| 2,304,323 | Wiegers | Dec. 8, 1942 |
| 2,621,889 | Annin | Dec. 16, 1952 |

UNITED STATES PATENT OFFICE
CERTIFICATION OF CORRECTION

Patent No. 2,965,128                      December 20, 1960

Alexander Silver

It is hereby certified that error appears in the above numbered patent requiring correction and that the said Letters Patent should read as corrected below.

Column 1, line 41, for "many" read -- may --; column 2, line 4, for "and", first occurrence, read -- an --; column 6, lines 55, 58 and 61, after "wall", each occurrence, insert -- member --.

Signed and sealed this 4th day of July 1961.

(SEAL)
Attest:

ERNEST W. SWIDER                      DAVID L. LADD
Attesting Officer                      Commissioner of Patents